(12) United States Patent
Kotnis et al.

(10) Patent No.: US 10,021,246 B2
(45) Date of Patent: Jul. 10, 2018

(54) IDENTIFYING INFORMATION PERTINENT TO AN EMERGENT EVENT THROUGH SOCIAL MEDIA POSTINGS

(71) Applicant: Avaya Inc., Basking Ridge, NJ (US)

(72) Inventors: Sanjog Narayan Kotnis, Pune (IN); Paul Roller Michaelis, Louisville, CO (US); Mark J. Fletcher, Ringwood, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/152,689

(22) Filed: May 12, 2016

(65) Prior Publication Data
US 2017/0331954 A1    Nov. 16, 2017

(51) Int. Cl.
| | | |
|---|---|---|
| *H04M 11/00* | (2006.01) | |
| *H04M 3/51* | (2006.01) | |
| *H04L 12/58* | (2006.01) | |
| *H04L 29/08* | (2006.01) | |
| *H04M 3/42* | (2006.01) | |
| *H04M 7/00* | (2006.01) | |

(52) U.S. Cl.
CPC ........... *H04M 3/5116* (2013.01); *H04L 51/32* (2013.01); *H04L 67/22* (2013.01); *H04M 3/42068* (2013.01); *H04M 3/42357* (2013.01); *H04M 3/5191* (2013.01); *H04M 7/0024* (2013.01)

(58) Field of Classification Search
CPC ............. H04M 3/5116; H04M 3/5191; H04M 7/0024; H04M 3/42357; H04M 3/42068; H04L 51/32; H04L 67/22
See application file for complete search history.

(56) References Cited

U.S. PATENT DOCUMENTS

| | | | |
|---|---|---|---|
| 2011/0314144 A1* | 12/2011 | Goodman | G06Q 10/06 709/224 |
| 2012/0256745 A1* | 10/2012 | Piett | G06Q 30/02 340/540 |
| 2015/0326710 A1* | 11/2015 | Amerling | H04M 3/38 379/243 |
| 2016/0227589 A1* | 8/2016 | Marshall | H04W 4/02 |

* cited by examiner

*Primary Examiner* — Stella Woo

(57) ABSTRACT

Embodiments disclosed herein provide systems, methods, and computer readable media for identifying information pertinent to an emergent event through social media postings. In a particular embodiment, a method provides, in an emergency contact center, receiving a communication initiated by an individual in response to an emergent event and identifying the individual. The method further provides identifying social media data of the individual created prior to receiving the communication and extracting first data pertinent to the emergent event from the social media data.

15 Claims, 5 Drawing Sheets

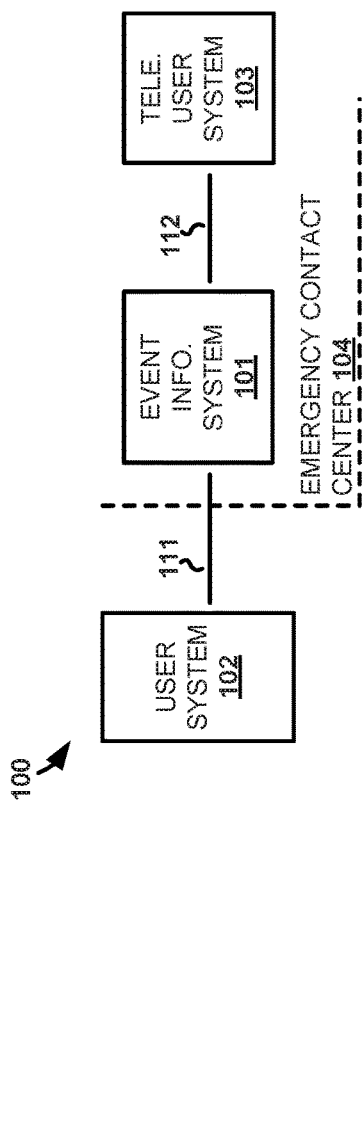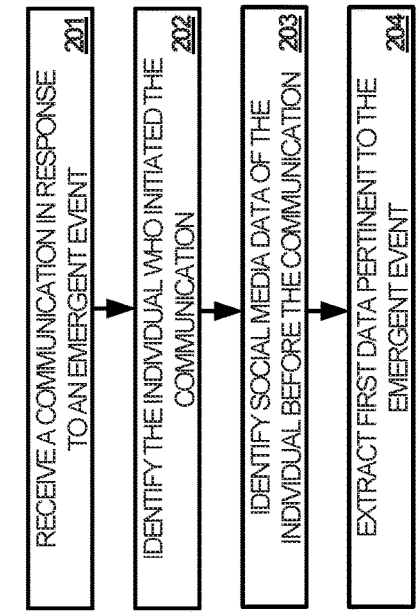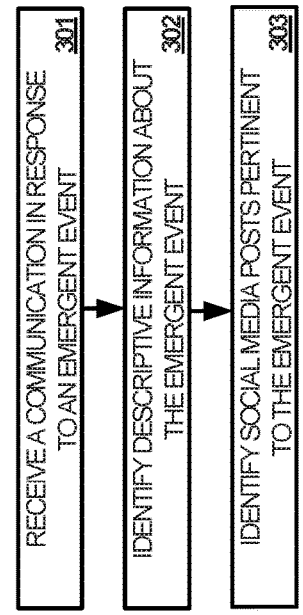

IDENTIFYING INFORMATION PERTINENT TO AN EMERGENT EVENT THROUGH SOCIAL MEDIA POSTINGS

TECHNICAL FIELD

Aspects of the disclosure are related to assisting emergency contact centers and, in particular, to obtaining information pertinent to an emergent event through social media postings.

TECHNICAL BACKGROUND

Emergency contact centers, such as a Public Service Answering Point (PSAP), Emergency Operations Center (EOC), etc., have long been around to accept communications from individual who are experiencing, witnessing, or otherwise associated with an emergent even. For example, in the United States, an individual may initiate an emergency session, such as a 911 call, to a PSAP so that a telecommunicator at the PSAP can try to help with the individual's emergency. Some emergency contact centers are now also accepting modes of communication other than just calls (e.g. a text sent to the 911 number). Regardless of the communication mode, a telecommunicator at the emergency contact center will attempt to glean as much information as possible about the individual's emergent event. That information is then used by the telecommunicator to either provide instructions to the individual or direct emergency responders (e.g. firefighters, police, etc.) to the emergent event.

Ideally, information about the emergent event would be easily obtained from the individual. However, especially in emergency situations, the individual may not be in a position or state of mind that is conducive to providing all information that would be beneficial to the telecommunicator when attempting to help. In fact, depending on the scope of the emergent event, the individual may not be aware of all pertinent information even if the individual was in a position or state of mind to provide the information to the telecommunicator. As such, for many calls, emergency telecommunicators have to handle an emergent event without knowing much of the information pertinent to the emergent event.

OVERVIEW

Embodiments disclosed herein provide systems, methods, and computer readable media for identifying information pertinent to an emergent event through social media postings. In a particular embodiment, a method provides, in an emergency contact center, receiving a communication initiated by an individual in response to an emergent event and identifying the individual. The method further provides identifying social media data of the individual created prior to receiving the communication and extracting first data pertinent to the emergent event from the social media data.

In some embodiments, the method provides presenting the first data to a telecommunicator at the PSAP upon connection of the communication to a position on the telecommunicator's computer aided dispatch system.

In some embodiments, extracting the first data comprises identifying information about physical circumstances of the individual prior to receiving the communication.

In some embodiments, the physical circumstances include at least one of who the individual is with, what the individual is doing, where the individual is going, and historical behavior of the individual.

In some embodiments, identifying the information about the physical circumstances comprises, from the social media data, identifying a physical circumstance of the individual at a first time prior to receiving the communication, determining a threshold amount of time that the physical circumstance will likely last, and including the physical circumstance in the information about the physical circumstances when the communication is received within the threshold amount of time relative to the first time.

In some embodiments, the physical circumstance comprises a physical location of the individual and wherein the threshold amount of time includes an amount of time that the individual would typically remain at the physical location.

In some embodiments, the physical circumstance includes one or more people who are with the individual and wherein the threshold amount of time includes an amount of time for an activity being partaken in by the individual and the one or more people.

In some embodiments, the social media data includes posts made by the individual to one or more social media platforms and the posts include one or more of text information, photographic information, video information, or audio information.

In another embodiment, a method provides, in an emergency contact center, receiving a communication initiated by an individual in response to an emergent event. The method further provides identifying first information descriptive of the emergent event. The first information indicates at least a time of occurrence for the emergent event. Also, the method provides using the first information to identify first social media posts after the time of occurrence and pertinent to the emergent event.

In some embodiments, identifying the first information comprises receiving user input from a telecommunicator of the emergency contact center indicating the first information as provided to the telecommunicator by the individual.

In some embodiments, identifying the first information comprises identifying the individual, identifying social media data of the individual created prior to receiving the communication, and extracting the first information from the social media data.

In some embodiments, the first information further includes a location of the emergent event, a type of emergent event, and an identity of the individual.

In some embodiments, using the first information to identify the first social media posts comprises identifying one or more other users associated with the identity of the individual and determining social media posts of the other users pertinent to the emergent event.

In some embodiments, determining the social media posts of the other users pertinent to the emergent event comprises identifying social media posts of the other users that mention the location.

In some embodiments, identifying the other users comprises determining whether the other users were mentioned in posts indicating that the other users would be at the location of the emergent event at the occurrence time.

In some embodiments, using the first information to identify the first social media posts comprises identifying social media posts having been made within a threshold distance from the location of the emergent event.

In some embodiments, using the first information to identify the first social media posts comprises identifying key words in social media posts pertinent to the type of emergent event.

In some embodiments, using the first information to identify the first social media posts comprises processing images in social media posts to identify images pertinent to the type of emergent event.

In some embodiments, the first social media posts include posts made to one or more social media platforms and include one or more of text information, photographic information, video information, or audio information.

In yet another embodiment, an event information system is provided having one or more computer readable storage media and a processing system operatively coupled with the one or more computer readable storage media. The event information system further includes program instructions stored on the one or more computer readable storage media that, when read and executed by the processing system, direct the processing system to receive a communication initiated by an individual in response to an emergent event and identify the individual. The instructions further direct the processing system to identify social media data of the individual created prior to receiving the communication and extract first data pertinent to the emergent event from the social media data. Additionally, the instructions direct the processing system to use the first data to identify first information descriptive of the emergent event. The first information indicates at least a time of occurrence for the emergent event. Further, the instructions direct the processing system to use the first information to identify first social media posts after the time of occurrence and pertinent to the emergent event.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a communication environment for identifying information pertinent to an emergent event through social media postings.

FIG. 2 illustrates a method of operating in the communication environment to identify information pertinent to an emergent event through social media postings.

FIG. 3 illustrates another method of operating in the communication environment to identify information pertinent to an emergent event through social media postings.

DETAILED DESCRIPTION

Figure 4:
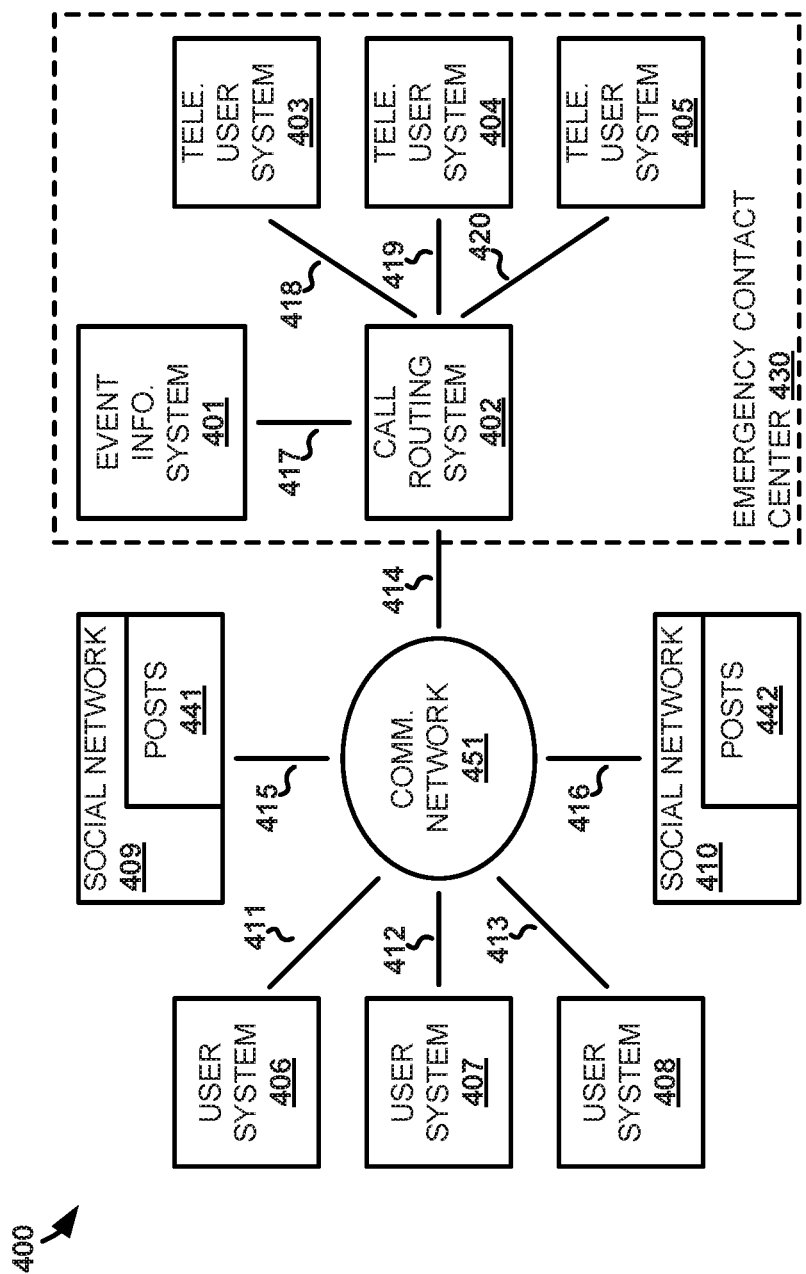
FIG. 4 illustrates another communication environment for identifying information pertinent to an emergent event through social media postings.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

As noted in the background above, the handling of emergency calls by an emergency contact center telecommunicator is oftentimes hampered by a lack of information about an emergent event that is the subject of a call. The lack of information may be due to reasons ranging from the individual themselves not knowing all pertinent information about the emergent event to the individual's inability to express that pertinent information even though the individual is aware of the information. Moreover, timeliness of the contact center telecommunicator could also be an issue where, in some situations, it may be difficult to coax the right information out of the individual.

However, through the use of many modern social networks (e.g. Facebook, Twitter, Instagram, Snapchat, etc.), people are now posting more and more information online about their lives. This online information may include information that would be helpful to telecommunicators at an emergency contact center. For instance, many social media users today are posting text, photos, video, etc. about emergent events as they are taking place in real-time, as well as immediately after it has occurred, but prior to the arrival of emergency services. That information is relevant and useful to a telecommunicator when deciding how to handle the resources dispatched to the emergent event. Moreover, postings made before the occurrence of an emergent event may further be useful to the telecommunicator to provide contextual information about an event (e.g. where it might be located, the type of event, who is involved, etc.). As such, the event information systems described below are able to sort out pertinent information posted to social networks and provide it to emergency contact center telecommunicators in a timely manner. The telecommunicators can then use pertinent information about an emergent event to handle a call regarding the emergent event.

FIG. 1 illustrates communication environment 100 for identifying information pertinent to an emergent event through social media postings. Communication environment 100 includes event information system 101, user system 102, and telecommunicator user system 103. Event information system 101 and telecommunicator user system 103 are part of emergency contact center 104. Event information system 101 and user system 102 communicate over communication link 111. Event information system 101 and telecommunicator user system 103 communicate over communication link 112.

In operation, telecommunicator user system 103 is one of possibly many user systems operated by respective telecommunicators of emergency contact center 104. Each emergency communication to emergency contact center 104 is routed to at least one of the telecommunicator user systems so that the operating telecommunicator can handle the communication. Event information system 101 may route the communications to particular telecommunicators, based on contextual information associated to the individual, and a matching skillset possessed by the telecommunicator, or may rely on a separate communication routing system. Once an incoming communication has been received in emergency contact center 104, event information system 101 begins compiling pertinent information about an emergent event to provide to the telecommunicator selected to handle a communication, as described below.

FIG. 2 illustrates method 200 of operating in communication environment 100 to identify information pertinent to an emergent event through social media postings. Method 200 provides, in emergency contact center 104, event information system 101 receiving a communication initiated by an individual in response to an emergent event (step 201). In this case, the individual uses user system 102 to initiate the communication to emergency contact center 104. It should be understood that, while emergency contact centers typically receive voice calls, the communication may be initiated in a communication mode other than a standard voice call, such as text message, video call, email, an over the top communication service, or some other mode of communicating. Event information system 101 may itself receive the communication from user system 102 or may instead receive a notification that the communication has been received Likewise, event information system 101 receiving the communication may comprise event information system 101 receiving a notification of the communication from another system, such as a call routing system, rather than receiving the actual communication. As such, while event information system 101 is shown in the call path between systems 102 and 103, communications between systems 102 and 103 may not necessarily pass through event information system 101.

Method 200 then provides event information system 101 identifying the individual (step 202). The individual may be identified from a name or number associated with a telephone account of the individual, a name or number associated with a user account (or the user account itself) in the case of an over the top service, a name or number provided by a service provider for user system 102, a name or number provided by the individual themselves (i.e. to an IVR system, within a text communication, to a telecommunicator if the communication has already been connected to the telecommunicator, or otherwise), or in some other manner. In some cases, the individual may pre-register their communication modes with event information system 101 so that event information system 101 can more easily associate incoming communications with the individual.

Once the individual has been identified, method 200 provides event information system 101 identifying social media data of the individual created prior to receiving the communication (step 203). The social media data may be from one or more social media networks. Event information system 101 may access only that information that is available to the public or may have access to more additional posts depending on the type of social network and security measures in place on the social network. For example, some social networks allow a user to maintain security settings that indicate who may view certain posts or information in the user's profile. In such a social network, event information system 101 may only be able to view publically available posts, although, it is possible that the user may have previously granted access to event information system 101 to view posts that would not otherwise be available. For instance, the individual in this embodiment may associate event information system 101 with their social media account (e.g. make event information system 101 or emergency contact center systems in general a "friend" of the individual) so that event information system 101 can access secure posts when the individual initiates an emergency communication. Alternatively, the operator of the social media network may provide a means for emergency contact center systems to overcome certain security settings in emergency situations. Other ways in which event information system 101 may access social media data of the individual may also be envisioned.

Method 200 then further provides event information system 101 extracting data pertinent to the emergent event from the social media data (step 204). The data may include text, images, video, or other type of information that may be pertinent to the emergent event about which the individual is calling. The data may be data that would be viewable to users or may be backend data, such as metadata, that would not be viewable by users. To determine whether data is pertinent to the emergent event, event information system 101 may identify information in the social media data that would still be relevant at the time of the communication being received. For example, something the individual did the previous day would likely not be relevant. However, something that the individual says they will be doing around the time of the communication being received would be relevant. In some cases, information that is always true, such as the individual's gender or a chronic medical condition, may also be considered pertinent. Event information system 101 therefore attempts to extract the first data as being any data describing the individual's circumstances at the time the communication is received. As such, the data may indicate what the individual may be doing, who the individual may be with, where the individual is located, the individual's age, the individual's gender, or any other type of pertinent information—including combinations thereof—without having to obtain that information from the individual over the communication. Also, some posts of the individual may indicate possible circumstances for someone else (e.g. the individual is a parent who posted that they are excited for their child's upcoming game). Event information system 101 may consider that post as being pertinent to the emergent event just in case the individual is calling on that person's behalf, which may also trigger event information system 101 to further search social media data of that person in addition to the individual.

In some cases, method 200 may complete before the communication is connected to telecommunicator user system 103, which may be selected from multiple telecommunicator user systems for its operating telecommunicator to handle the communication. Although, in other cases, the communication may be connected to telecommunicator user system 103 as soon as possible in the interest of timeliness. Regardless, after identifying the data pertinent to the emergent event, event information system 101 presents the information in that data to the telecommunicator operating telecommunicator user system 103 by transferring the information to telecommunicator user system 103 where it is displayed or otherwise provided to the operating telecommunicator. The information of the data may be reformatted for ease of consumption by the telecommunicator or may be presented in the format of the social network from which the data was obtained. For example, emergency contact center 104 may have a standard display format into which information is placed so that telecommunicators always know where to look in the format to find particular items/types of information (e.g. if method 200 was able to discern who or how many others might be with the individual, then a designated area of the display format for companion information may be filled with that who/how many information).

Advantageously, the data extracted by method 200 at step 204 allows for the telecommunicator of telecommunicator user system 103 to be provided with pertinent data about the individual or the individual's situation, which may be pertinent to the emergent event. Event information system 101 would be able to sort through the social media data relatively quickly so that the telecommunicator is supplied with the pertinent data before or at least shortly after the communication from user system 102 is connected to telecommunicator user system 103. Providing the telecommunicator with the information from the pertinent data allows the telecommunicator to anticipate information regarding the emergent event about which the individual is communicating. The telecommunicator can then more effectively ask for additional details from the individual and direct emergency services.

FIG. 3 illustrates method 300 of operating in communication environment 100 to identify information pertinent to an emergent event through social media postings. As in method 200, method 300 begins with, in emergency contact center 104, event information system 101 receiving a communication initiated by an individual in response to an emergent event (step 301). In some cases, event information system 101 may perform both method 200 and method 300 and, in those cases, steps 201 and 301 may actually be the same step.

Method 300 then provides event information system 101 identifying information descriptive of the emergent event (step 302). The information indicates at least a time of occurrence for the emergent event. It should be understood that, since many emergent events are not instantaneous in nature, the occurrence time may be treated merely as a time when the emergent event started occurring or was otherwise known to have already been occurring (e.g. the individual came upon it after the emergent event started). In some situations, the time of occurrence may be equated to the time in which the communication is received. The information may further include a type of emergent event (e.g. fire, car accident, medical issue, robbery, etc.), a location of the emergent event, the identity of the individual, the identity of other people involved or around the emergent event, or any other information that may be useful as a basis for gathering additional information about the emergent event—including combinations thereof. In some examples, the information may be received by a telecommunicator operating telecommunicator user system 103 from the individual and input into telecommunicator user system 103, which transfers an indication of that input to event information system 101. In yet other examples, at least a portion of the information may be obtained from the pertinent data identified in method 200.

Method 300 the provides event information system 101 using the information to identify first social media posts after the time of occurrence and pertinent to the emergent event (step 303). The social media posts may be identified from multiple accounts and across multiple social media networks. Event information system 101 to those social media networks may be limited to only publically available posts or event information system 101 may be granted additional access to posts in a manner similar to that described above with respect to method 200.

Depending on the breadth of the information identified in step 302, event information system 101 can use that information to search for social media posts that may be relevant to the emergent event. It is also possible for additional information to be provided later in the communication (e.g. as the telecommunicator is able to obtain more information from the individual and enter that into telecommunicator user system 103) to broaden the amount of information that can be used at step 303. For example, event information system 101 may search for posts made from within a threshold distance of the location of the emergent event, posts that mention the location, posts that use keywords/phrases that relate to the type of emergent event (e.g. if the emergent event is a fire, then the search terms may include fire, burn, heat, flame, blaze, etc.), posts with photos or videos that image processing determines to show an event of the emergent event's type, or some other way in which relevant posts may be distinguished—including combinations thereof. Ideally, the identified posts will maintain first person accounts and, therefore, the location in which the post was created, if available, may weigh heavily into whether event information system 101 identifies the post as pertinent. Additionally, if anyone is known to be with the individual or assumed to be with the individual, as may have been identified in method 200, then event information system 101 may begin by searching the posts of those individuals before performing a wider search.

The identified posts may then be presented to the telecommunicator by event information system 101 via telecommunicator user system 103 either in their original format or reformatted to a standard display format similar to that discussed in method 200. Until the information is no longer needed by the Telecommunicator or the emergency service providers that may be dispatched to address the emergent event, event information system 101 may continue to identify pertinent posts since witnesses may continue to update their social media accounts indefinitely after the occurrence of the event. The identified posts can then be used to supplement the information provided by the individual to the telecommunicator over the communication and possibly be used by the telecommunicator to ask further questions stemming from the posts presented to the telecommunicator.

Referring back to FIG. 1, event information system 101 comprises a computer processor system and communication interface. Event information system 101 may also include other components such as a router, server, data storage system, and power supply. Event information system 101 may reside in a single device or may be distributed across multiple devices. While shown separately, event information system 101 may be incorporated into one or more of user systems 101, 102 and 103. Event information system 101 may be an application server, call routing system, personal computer workstation, network gateway system, or some other computing system—including combinations thereof.

User systems 102-103 each comprise a computer processor system and a communication interface. User systems 102-103 may also include other components such as a microphone, camera, display, router, server, data storage system, and power supply. User systems 102-103 may each reside in a single device or may be distributed across multiple devices. User systems 102-103 may be a telephone, computer, tablet, conference room system, e-book, mobile Internet appliance, network interface card, media player, game console, or some other communication apparatus—including combinations thereof.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

FIG. 4 illustrates communication environment 400 for identifying information pertinent to an emergent event through social media postings. Communication environment 400 includes event information system 401, call routing system 402, telecommunicator user systems 403-405, user systems 406-408, social networks 409-410, and communication network 451. Event information system 401, call routing system 402, and telecommunicator user systems 403-405 are part of emergency contact center 430. Call routing system 402, user systems 406-408, and social networks 409-410 all communicate with communication network 451 over communications links 411-416, respectively. Event information system 401 and telecommunicator user systems 403-405 all communicate with call routing system 402 over communication links 417-420, respectively. In some cases, additional links may connect event information system 401 and telecommunicator user systems 403-405 Likewise, emergency contact center 430 may include a local network for communications between elements therein.

Communication network 451 comprises network elements that provide communications services to elements 406-410. Communication network 451 may comprise switches, wireless access nodes, Internet routers, network gateways, application servers, computer systems, communication links, or some other type of communication equipment—including combinations thereof. Communication network 451 may be a single network, such as a local area network, a wide area network, or the Internet, or may be a combination of multiple networks.

Social networks 409-410 include one or more data servers and storage systems configured to maintain posts 441-442, respectively. The components of social networks 409-410 may be co-located or be geographically distributed. Social networks 409-410 may be accessed through dedicated applications or web browsers on various types of computing systems, such as user systems 406-408. Access to social networks 409-410 allows users to view or add to at least a portion of posts 441 and 442, respectively. Likewise, some types of social networks may allow users to comment on posts, share posts, post personal information in a user profile, or perform some other type of interaction.

In this example, emergency contact center 430 receives voice calls from individuals reporting emergent events that they believe require the attention of emergency contact center 430's telecommunicators or other emergency services personnel. Potential individuals may operate one of user systems 406-408 to call emergency contact center 430. Also, if any of user systems 406-408 have the proper capabilities (e.g. smartphone), those user systems may also be operated to post to and view posts of others on either or both of social networks 409-410. Other devices may also be used to post and access social networks 409-410.

Figure 5:
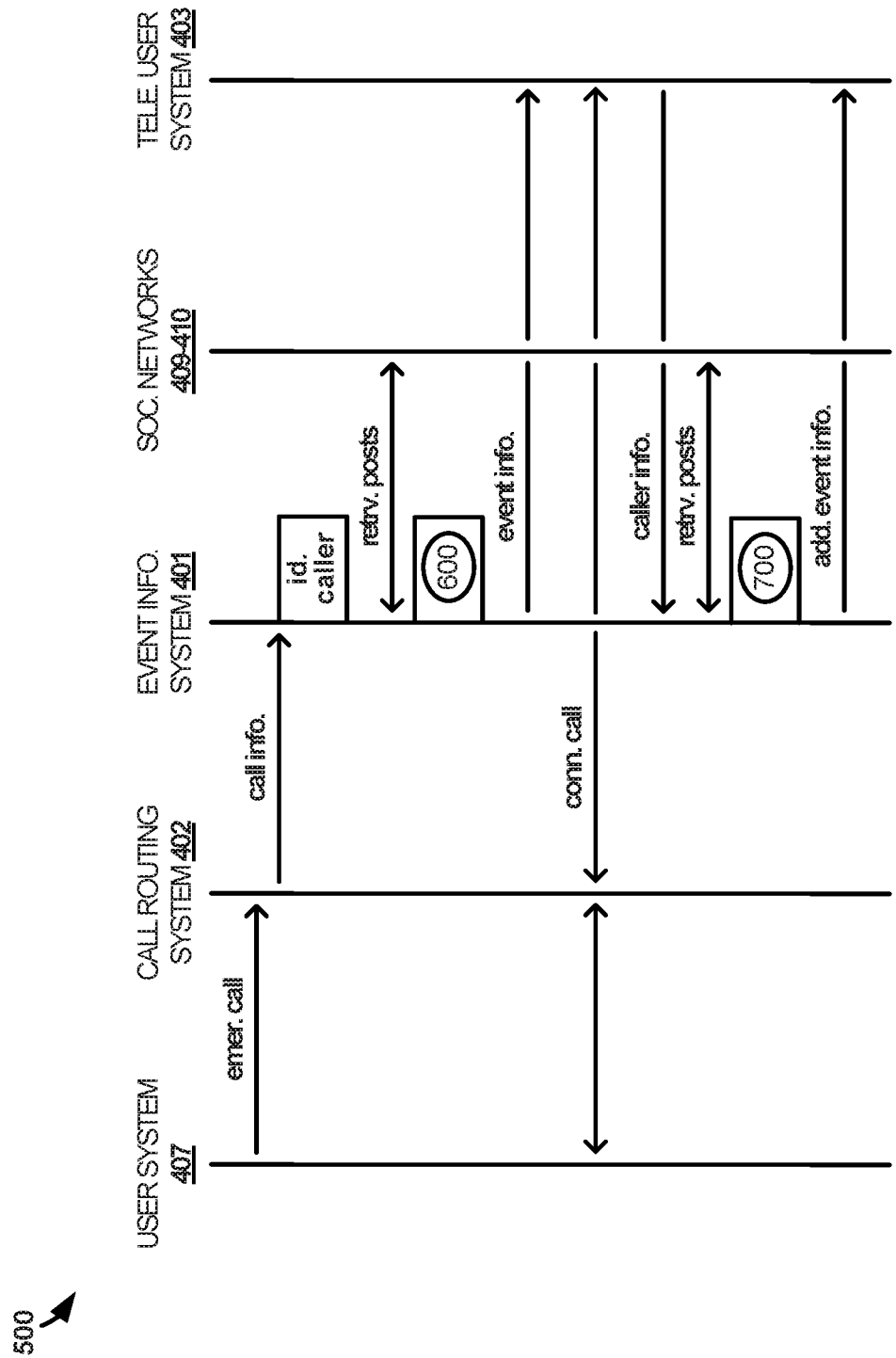
FIG. 5 illustrates an operational scenario of the other communication environment to identify information pertinent to an emergent event through social media postings.

FIG. 5 illustrates operational scenario 500 of the other communication environment to identify information pertinent to an emergent event through social media postings. In operational scenario 500, an individual operates user system 407 to place an emergency voice call to emergency contact center 430. In the United States, this voice call may be initiated by dialing 911 on user system 407, although other countries may use different number combinations. The emergency call is received into call routing system 402 of emergency contact center 430 for routing to a telecommunicator user system for an available telecommunicator to handle the emergency call.

In addition to selecting one of telecommunicator user systems 403-405 for routing the call, call routing system 402 transfers information about the call to event information system 401. The call information indicates to event information system 401 that the emergency call has been received. Also, the call information may indicate a telephone number for user system 407 or some other type of identifier for user system 407 that event information system 401 will use to identify the individual operating user system 407. Identifying the individual based on information that identifies user system 407 (i.e. a telephone number) may work on the assumption that an individual also associated with that telephone number is most likely the individual operating user system 407. In some cases, the individual may be identified due to the identifier of user system 407 being listed in a profile for the user in one of social networks 409-410. Other means of associating an individual with a user system identifier may also be used, including the individual pre-registering the identifier with event information system 401 at an earlier time.

Regardless of how the individual is identified, event information system 401 accesses social networks 409-410 to retrieve posts within posts 441-442 that were made by the individual. The posts may be retrieved by event information system 401 emulating a human user accessing social networks 409-410, using an Application Programming Interface (API) for each respective social network, which may be unique to emergency contact centers, or in some other manner. Method 600 is performed on the posts retrieved from social networks 409-410. While this example retrieves the posts from social networks 409-410 for processing using method 600, other examples may use APIs or other mechanisms, such as search functionality built into the social network's platform, to perform method 600.

Figure 6:
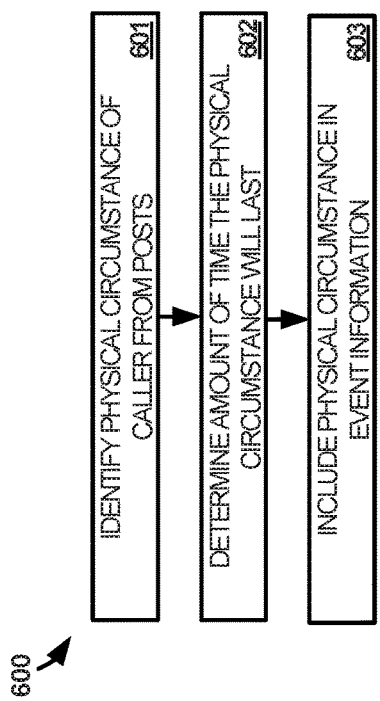
FIG. 6 illustrates a method used during the operational scenario of the other communication environment to identify information pertinent to an emergent event through social media postings.

FIG. 6 illustrates method 600 used during operational scenario 500 of communication environment 400 to identify information pertinent to an emergent event through social media postings. Method 600 provides that event information system 401 identifies one or more physical circumstances of the individual from the individual's posts to social networks 409-410 (step 601). The physical circumstances may be derived by performing a search for keywords or phrases in the posts (e.g. within the posts' body, hashtags, links, etc.), by performing image processing of an image or video post (e.g. facial or object recognition), by identifying metadata for the post that may not be viewable to human users, or by performing some other type of processing. The physical circumstances may include what the user is doing, where they are located or are going, how they are getting their (e.g. car, train, etc. and whether they are the driver or passenger), who they are with, when they will be at a location, medical issues (e.g. individual may have posted about having high blood pressure or other medical condition), or any other type of physical circumstance the individual may find themselves in—including combinations thereof.

Method 600 further provides event information system 401 determining a threshold amount of time each physical circumstance will last (step 602). The amount of time may be based on information provided in the individual's posts and/or based on information either known by event information system 401 or retrieved from an external source. In an example of the former, one of the individual's post may indicate in the afternoon that the individual is going to a particular restaurant for dinner "tonight." If the emergency call is received within a time window that could constitute dinner time that night, event information system 401 may then determine that the individual may likely be at the restaurant at the time of the call. Likewise, if the individual posted that they will be having dinner wither certain people, then event information system 401 may determine that those people will be with the individual during the dinner timeframe. Alternatively, if the individual said they were going to a play, then event information system 401 may be able to reference a calendar for the theater (e.g. a calendar published to the theater's website) to determine a start time and a length of time for the play. Event information system 401 could then determine whether the individual is likely to still be at the play. If the emergency call is received outside of the play's run time, then event information system 401 may determine that the individual is not likely at the play. Although, event information system 401 may still determine that the individual could be near the theater if the emergency call is received within a threshold amount of time before or after the play's run time. In that case, the physical circumstance may be that the individual is near the theater.

If a physical circumstance satisfies the threshold amount of time such that it is likely pertinent to the emergent event about which the individual initiated the emergency call, then event information system 401 includes that circumstance in information about the emergent event that is to be presented to a telecommunicator. As noted above, event information system 401 may simply provide the post(s) from which the physical circumstance was determined or may transform the information into a new format for presentation.

Referring back to operational scenario 500, after method 600 has identified the event information (or as the physical circumstances are added to the event information), the even information is presented to a telecommunicator of emergency contact center 430 by passing the event information to a telecommunicator user system selected by call routing system 402. In this particular example, call routing system 402 selects telecommunicator user system 403 from telecommunicator user systems 403-405. Therefore, the even information is transferred to telecommunicator user system 403 where it is presented (e.g. displayed) to its operating telecommunicator.

In this example, the emergency call is connected to telecommunicator user system 403 after the even information is transferred to telecommunicator user system 403 by event information system 401. This sequence of events may be sufficient if event information system 401 can identify the event information fast enough so as to not keep the individual waiting too long. However, in other examples, the call may be connected to 403 as soon as call routing system 402 can possibly connect the call and event information system 401 works contemporaneously to provide the event information as fast as possible.

During the call, the telecommunicator may receive additional information from the individual about the emergent event. This additional information may include details about the emergent event including the event type, the event location, what type of emergency assistance is needed, who else the individual knows at the event, or any other information that the telecommunicator may be able to obtain from the individual over the voice call. This individual provided information may be entered into telecommunicator user system 403 by the telecommunicator, may be obtained from a speech recognition application running on a system in emergency contact center 430, or may be obtained in some other way before being transferred to event information system 401. In some cases, the individual provided information will confirm or dispute the event information identified in method 600. In those cases, the telecommunicator may indicate through telecommunicator user system 403 whether certain items of the previously identified information were correct and, if necessary, provide the correct information. For example, the individual may not be at the location of the emergent event (e.g. calling for someone else or calling after they left the emergent event). The individual may therefore provide information about the emergent event to the telecommunicator (e.g. actual location, people who might still be at the event's location, etc.) that can be used to augment or correct information determined in method 600.

Whether event information system 401 uses information identified during method 600 or provided by the individual on the call (or both), the information is used to retrieve additional posts of posts 441-442 of social network 409-410, respectively. These additional posts can be from any user of social networks 409 and/or 410 but that are posted after the occurrence time of the emergent event about which the individual is calling. As noted above, the occurrence time of the emergent event is a point in time that the event is thought to have begun occurring or at least it was noticed as having begun (e.g. when a fire first started or was first noticed). Method 700 is then used by event information system 401 to identify event information from the posts. As with method 600, method 700 in this example is performed on posts retrieved from social networks 409-410, although, event information system 401 may use features of the social network platform to perform method 700.

Figure 7:
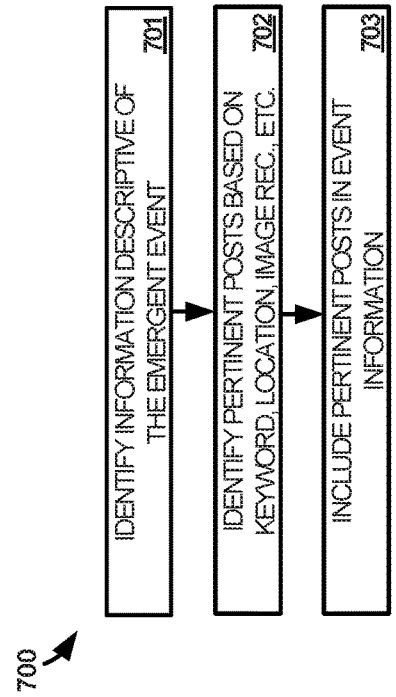
FIG. 7 illustrates another method used during the operational scenario of the other communication environment to identify information pertinent to an emergent event through social media postings.

FIG. 7 illustrates method 700 used during operational scenario 500 of communication environment 400 to identify information pertinent to an emergent event through social media postings. In particular, method 700 provides event information system 401 identifying information descriptive of the emergent event (step 701). This descriptive information may be information identified during method 600 and/or provided by the individual on the call. The descriptive information may include any information that could identify posts about the specific emergent event from the numerous other posts in posts 441-442. The descriptive information may include the type of event, location of the event, witnesses to the event, or some other type of descriptive information.

Method 700 then provides event information system 401 using the descriptive information to identify pertinent posts based on keywords, location post was created at, location mentioned in the post, image processing to identify the event or witnesses in photos or videos, or some other manner of using descriptive information to sort through posts (step 702). In some cases, the identified posts may provide additional descriptive information that can be fed back event information system 401 to look for even more posts pertinent to the emergent event. For example, if the individual is only aware of their friends in the vicinity of the emergent event, event information system 401 may find posts identifying other witnesses to the emergent event and can search for whether those witnesses posted anything about the event.

Any information that event information system 401 does determine to be pertinent to the emergent event is included in additional event information to be presented to the telecommunicator at telecommunicator user system 403 (step 703). As was the case in method 600, the posts identified for inclusion in the event information may be included as is or may be reformatted. In one example, event information system 401 may group photos of the event together so that they can be presented to the telecommunicator as group for easy viewing.

Referring again back to operational scenario 600, event information system 401 presents the additional information about the emergent event to the telecommunicator by transferring the additional information to telecommunicator user system 403 for display. Since posts may continue to be created about the emergent event as the call is ongoing, method 700 may continue searching for more posting information about the emergent event indefinitely, until the call ends, or event information system 401 is otherwise instructed to stop.

Advantageously, in operational scenario 500, event information system 401 is able to first identify information about the calling party to help inform the telecommunicator about the individual and/or the individual's situation before the individual even speaks to the telecommunicator. Then, event information system 401 begins to collect information regarding the emergent event about which the calling party placed the emergency call. In this way, it is possible for the telecommunicator to be presented with far more information than the individual may otherwise be able to provide over the emergency call. The telecommunicator can then more effectively handle the individual and any emergency service providers needed to address the emergent event.

Figure 8:
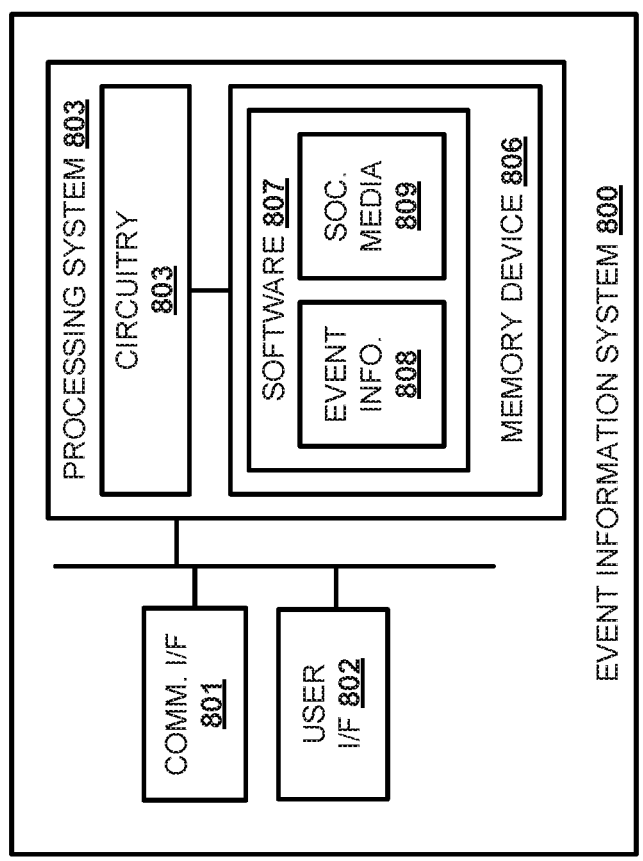
FIG. 8 illustrates a computing architecture for implementing an event information system to identify information pertinent to an emergent event through social media postings.

FIG. 8 illustrates a computing architecture for event information system 800. Event information system 800 is an example of event information systems 101 and 401, although systems 101 and 401 may use alternative configurations. Event information system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes event information module 808 and social media module 809. Operating software 807 may further include an operating system, utilities, drivers, network interfaces, applications, or some other type of software. When executed by circuitry 805, operating software 807 directs processing system 803 to operate event information system 800 as described herein.

In particular, event information module 808 directs processing system 803 to receive a communication initiated by an individual in response to an emergent event and identify the individual. Social media module 809 directs processing system 803 to identify social media data of the individual created prior to receiving the communication and extract first data pertinent to the emergent event from the social media data.

Additionally, or alternative to the above directions, social media module 809 directs processing system 803 to use the first data to identify first information descriptive of the emergent event. The first information indicates at least a time of occurrence for the emergent event. Social media module 809 also directs processing system 803 to use the first information to identify first social media posts after the time of occurrence and pertinent to the emergent event.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for identifying information related to an emergent event from social media, the method comprising:
   in an emergency contact center:
      receiving a communication initiated by an individual in response to an emergent event;
      identifying the individual;
      in an event information system, using an Application Programming Interface (API) of at least one social media server to retrieve social media data of the individual created prior to receiving the communication; and
      extracting first data pertinent to the emergent event from the social media data, wherein extracting the first data comprises:
      identifying information about physical circumstances of the individual prior to receiving the communication, the physical circumstances include at least one of who the individual is with, what the individual is doing, where the individual is going, and historical behavior of the individual;
      wherein identifying the information about the physical circumstances comprises:
         from the social media data, identifying a physical circumstance of the individual at a first time prior to receiving the communication;
         determining a threshold amount of time that the physical circumstance will likely last; and
         including the physical circumstance in the information about the physical circumstances when the communication is received within the threshold amount of time relative to the first time.

2. The method of claim 1, further comprising:
   presenting the first data to a telecommunicator of the contact center upon connection of the communication to a telecommunicator system of the telecommunicator.

3. The method of claim 1, wherein the physical circumstance comprises a physical location of the individual and wherein the threshold amount of time includes an amount of time that the individual would typically remain at the physical location.

4. The method of claim 1, wherein the physical circumstance includes one or more people who are with the individual and wherein the threshold amount of time includes an amount of time for an activity being partaken in by the individual and the one or more people.

5. The method of claim 1, wherein the social media data includes posts made by the individual to one or more social media platforms and the posts include one or more of text information, photographic information, video information, or audio information.

6. An event information system of an emergency contact center for identifying information related to an emergent event from social media, the event information system comprising:
one or more computer readable storage media;
a processing system operatively coupled with the one or more computer readable storage media; and
program instructions stored on the one or more computer readable storage media that, when read and executed by the processing system, direct the processing system to:
use an Application Programming Interface (API) of at least one social media server to retrieve social media data of an individual created prior to receiving the communication, wherein the individual is identified in response to the emergency contact center receiving a communication initiated by the individual in response to an emergent event; and
extract first data pertinent to the emergent event from the social media data, wherein to extract the first data the program instructions direct the processing system to:
identify information about physical circumstances of the individual prior to receiving the communication, the physical circumstances include at least one of who the individual is with, what the individual is doing, where the individual is going, and historical behavior of the individual;
wherein to identify the information about the physical circumstances the program instructions direct the processing system to:
from the social media data, identify a physical circumstance of the individual at a first time prior to receiving the communication;
determine a threshold amount of time that the physical circumstance will likely last; and
include the physical circumstance in the information about the physical circumstances when the communication is received within the threshold amount of time relative to the first time.

7. The event information system of claim 6, wherein the program instructions further direct the processing system to:
present the first data to a telecommunicator of the contact center upon connection of the communication to a telecommunicator system of the telecommunicator.

8. The event information system of claim 6, wherein the physical circumstance comprises a physical location of the individual and wherein the threshold amount of time includes an amount of time that the individual would typically remain at the physical location.

9. The event information system of claim 6, wherein the physical circumstance includes one or more people who are with the individual and wherein the threshold amount of time includes an amount of time for an activity being partaken in by the individual and the one or more people.

10. The event information system of claim 6, wherein the social media data includes posts made by the individual to one or more social media platforms and the posts include one or more of text information, photographic information, video information, or audio information.

11. One or more non-transitory computer readable storage media having program instructions stored thereon for identifying information related to an emergent event from social media, the program instructions, when executed by a processing system, direct the processing system to:
use an Application Programming Interface (API) of at least one social media server to retrieve social media data of an individual created prior to receiving the communication, wherein the individual is identified in response to the emergency contact center receiving a communication initiated by the individual in response to an emergent event; and
extract first data pertinent to the emergent event from the social media data, wherein to extract the first data the program instructions direct the processing system to:
identify information about physical circumstances of the individual prior to receiving the communication, the physical circumstances include at least one of who the individual is with, what the individual is doing, where the individual is going, and historical behavior of the individual;
wherein to identify the information about the physical circumstances the program instructions direct the processing system to:
from the social media data, identify a physical circumstance of the individual at a first time prior to receiving the communication;
determine a threshold amount of time that the physical circumstance will likely last; and
include the physical circumstance in the information about the physical circumstances when the communication is received within the threshold amount of time relative to the first time.

12. The one or more non-transitory computer readable storage media of claim 11, wherein the program instructions further direct the processing system to:
present the first data to a telecommunicator of the contact center upon connection of the communication to a telecommunicator system of the telecommunicator.

13. The one or more non-transitory computer readable storage media of claim 11, wherein the physical circumstance comprises a physical location of the individual and wherein the threshold amount of time includes an amount of time that the individual would typically remain at the physical location.

14. The one or more non-transitory computer readable storage media of claim 11, wherein the physical circumstance includes one or more people who are with the individual and wherein the threshold amount of time includes an amount of time for an activity being partaken in by the individual and the one or more people.

15. The one or more non-transitory computer readable storage media of claim 11, wherein the social media data includes posts made by the individual to one or more social media platforms and the posts include one or more of text information, photographic information, video information, or audio information.

* * * * *